May 6, 1941.  R. W. RICE  2,240,859
SOIL CONDITIONER AND METHOD OF EMPLOYING THE SAME
Filed April 17, 1939
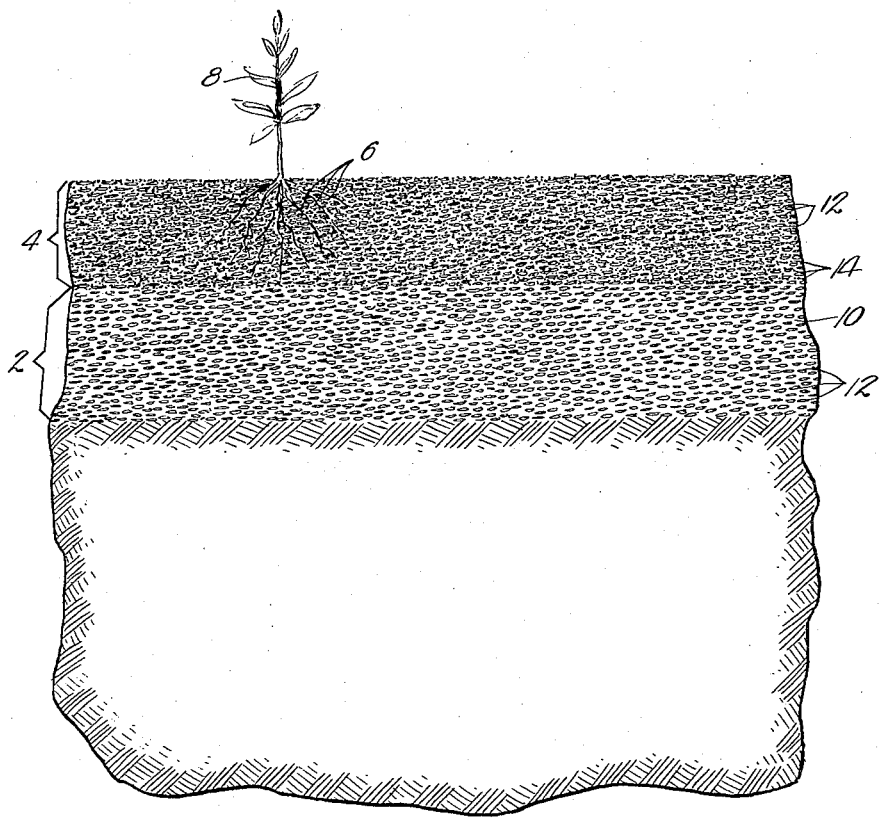
INVENTOR.
Ralph W. Rice
BY
ATTORNEYS Patented May 6, 1941

2,240,859

UNITED STATES PATENT OFFICE 2,240,859

SOIL CONDITIONER AND METHOD OF EMPLOYING THE SAME

Ralph W. Rice, Kansas City, Mo.

Application April 17, 1939, Serial No. 268,335

4 Claims. (Cl. 47—1)

This invention relates to the art of conditioning soil and preparing seed beds for growing plants and has for its primary object the provision of a mineral moisture and air retaining substance that supplants organic mulches, sand and other conditioners now employed.

One of the important objects of this invention is to provide a soil conditioner which will present a myriad of cells within a permanent, neutral, fungus free and insect free mineral that holds moisture and air, which conditioner will always remain loose, loamy and friable.

A still further object of the instant invention is to employ expanded vermiculite as a said conditioner and to utilize the peculiar structural features of granulated, expanded vermiculite in a novel and advantageous manner that will present unique means for holding moisture and air for plant roots; that will preclude soil packing and crusting; that will aerate the soil to permit plant root breathing; that will establish a drinking and breathing cycle for plant roots; and that will economically condition a large volume of soil per given amount of conditioner.

A yet further aim of this invention is to supply a soil conditioner consisting of expanded vermiculite, the physical characteristics of which, and the manner of producing the same, insures that no damaging fungus or insect life can be present therein, after heat treatment to expand and before introduction into the soil; that it will not rot nor decompose after applying; that it is permanent and may be supplemented from time to time; and that it presents nothing upon which insect life nor parasites can thrive.

This invention has for an additional object, the provision of a seed sprouting bed and method of preparing the same wherein expanded vermiculite plays the important part because of its peculiar and advantageous characteristics such as have been set down hereinabove. The seed bed contemplated is diagrammatically shown in the accompanying drawing and consists of expanded vermiculite and soil, mixed in the proportion of one part expanded vermiculite to from three to five parts of soil, both by volume.

This invention has for an important object the provision of a seed bed for plant growing which comprises a top layer 4 of intermixed expanded vermiculite granules 12 and pulverized soil 14, over a layer 2 of expanded vermiculite, which acts as a reservoir for the plant roots 6 to tap when necessary.

Heretofore, soil conditioners sold to the layman and more extensively employed by the nurserymen have been sand, organic mulch, such as peat and other heavy and relatively solid substances. It is the common practice to combine sand and peat in an effort to condition soil for seed beds, but no usage of these conditioners has ever equaled expanded vermiculite because of the contraction and change of form which always occurs.

Expanded vermiculite is obtainable on the open market and is sold under many trade names. Heat treating of vermiculite after mining results in separating the laminations of the mineral. One of the general characteristics of the vermiculite is its pitted surfaces. After grinding or dividing into granules, the scales or laminations will have air spaces therebetween. If a granule of expanded vermiculite is cut across the laminations, that is perpendicular to the cleavage, the cross section shows spaces between the laminations or scales to be various sizes, ranging from $\frac{1}{16}$ inch down to one invisible to the naked eye. The thickness of the scales is not uniform, some being as thick as $\frac{1}{32}$ in. or $\frac{1}{64}$ in. when expanded.

Expanded vermiculite is light in weight and bulky. It weighs about twenty-two (22) pounds per cubic foot and, therefore, is efficient as a soil conditioner because a given amount will condition fifty times its weight of soil.

Being a mineral, vermiculite will not decompose, shrink nor spoil. It will meet all requirements for fulfilling the objects set down above, and will serve as a soil conditioner for plants in all stages of growth. There is no danger of losing the advantages once gained through the application of vermiculite, because it is permanent, insoluble in water, acids or alkalis, and will never change its cellular structure that renders it so valuable as a medium for holding moisture and air. Its inert character and ability to remain friable are also conducive to plant growth when mixed with the soil to form a seed or root-receiving bed.

When employing expanded vermiculite as a conditioner for soil, the moisture requirements of the plant should be considered. Usually when clay or soil of high density is present, the expanded vermiculite should be mixed in the proportion of one part expanded vermiculite to form three to five parts by volume of the soil.

It is best to have the granules of the expanded vermiculite small enough to pass through a ½ in. mesh screen and large enough to be retained by a 30 mesh screen. Granules produced by such screening will be best to maintain the soil loose and friable as moisture in sufficient quantities is retained.

After a seed bed is once prepared, more of the soil conditioner may be admixed until the bed receives and holds water in larger than usual quantities, yet is loose as drying out occurs. If a crust appears on the surface when the moisture has been absorbed, more of the conditioner should be introduced.

Seed beds of exceptional value are prepared by using a layer 2 of pure expanded vermiculite over which the layer 4 of intermixed expanded vermiculite and soil is spread to receive the seed or roots 6 of plants 8. The lower layer 2, which should be at least four inches (4 in.) thick, will form a reservoir for tap roots and the gradual dehydration of the upper layer 4 will be prolonged because of the supply of moisture which enters from below.

As the water is evacuated from the many cells in the expanded vermiculite soil conditioner and from the spaces 10 between the vermiculite granules 12, air enters to replace the moisture. This property and action is important for there is no contraction nor change in form to affect the seed or roots 6.

Seed beds constructed in accordance with this invention, may be of different character than those described herein, and advantages in addition to those set down above will be enjoyed by using the discovery disclosed.

The value of this soil conditioner is exemplified by the following:

One nurseryman planted seed in the heretofore used soil prepared with organic mulch and sand. Nineteen hundred and thirty plants were produced. The same number of seeds planted in soil conditioned with one part expanded vermiculite to three parts soil, produced forty-three hundred and fifty plants; nearly two and one-half times as many plants.

In view of the advantages arising from the invention, it is desired to be limited in the enjoyment thereof only by the scope of the appended claims.

Having thus described the invention, what I claim and desire to secure by Letters Patent is:

1. Seed sprouting and plant growing soil comprising a top layer of expanded vermiculite and soil of relatively high density and a layer of expanded vermiculite underlying said top layer.

2. Seed sprouting and plant growing soil comprising a top layer consisting of one part by volume of expanded vermiculite, and from three to five parts by volume of soil of relatively high density; and a layer of expanded vermiculite underlying said top layer.

3. The method of preparing a seed bed of the kind described which consists in spreading a layer of expanded vermiculite; and covering said layer with a top, seed-receiving layer of expanded vermiculite and soil of relatively high density.

4. The method of preparing a seed bed of the kind described, which consists in spreading a layer of granular expanded vermiculite; covering said layer with a top layer of granular expanded vermiculite and soil of relatively high density; and filling the interstices of the expanded vermiculite granules with water, said last mentioned layer being provided to receive the seed and roots of the plants.

RALPH W. RICE.